United States Patent
Andrieu et al.

(10) Patent No.: US 6,597,850 B2
(45) Date of Patent: Jul. 22, 2003

(54) OPTICAL FIBER AND FIBRE-OPTIC CABLE COMPRISING AT LEAST ONE INTERMETALLIC ELEMENT THAT ABSORBS HYDROGEN

(75) Inventors: Xavier Andrieu, Bretigny sur Orge (FR); Anne Decaumont, Bretigny sur Orge (FR); Bernard Knosp, La Garenne Colombes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/168,105
(22) PCT Filed: Dec. 7, 2000
(86) PCT No.: PCT/FR00/03425

§ 371 (c)(1),
(2), (4) Date: Jun. 17, 2002

(87) PCT Pub. No.: WO01/46736
PCT Pub. Date: Jun. 28, 2001

(65) Prior Publication Data
US 2003/0002828 A1 Jan. 2, 2003

(30) Foreign Application Priority Data
Dec. 22, 1999 (FR) .............................................. 99 16864

(51) Int. Cl.$^7$ .................................................. G02B 6/02
(52) U.S. Cl. .......................... 385/128; 385/123; 385/144
(58) Field of Search ................................ 385/123, 124, 385/125, 126, 127, 128, 141, 142, 144

(56) References Cited

U.S. PATENT DOCUMENTS 4,696,543 A   9/1987 Pitt et al.
4,718,747 A * 1/1988 Bianchi et al. ............. 385/128

FOREIGN PATENT DOCUMENTS

| EP | 0718654 A1 | 6/1996 |
| EP | 0552790 A1 | 7/1998 |
| GB | 1572796 | 8/1980 |
| GB | 2144878 A | 3/1985 |

OTHER PUBLICATIONS

Patent Abstract of Japan, vol. 013, No. 107 (C–576), Mar. 14, 1989 corresponding to JP63282226 A (Japan Steel Works Ltd) Nov. 18, 1988.

* cited by examiner

Primary Examiner—David V. Bruce
Assistant Examiner—Hoon K. Song
(74) Attorney, Agent, or Firm—Sughrue Mion, PLLC

(57) ABSTRACT

In a covering outside its light-guiding portion, an optical fiber includes at least one crystalline intermetallic compound made up of at least two metals, the compound having a plateau pressure during hydride formation that is less than equal to $5 \times 10^{-2}$ atm (where 1 atm=$1.013 \times 10^5$ Pa) as measured at 30° C. by a PCT method, the compound being of the form $AB_xM_y$ where A is constituted by at least one element from columns IIa, IIIb, or IVb of the periodic classification of the elements (CAS version), B is constituted by at least one element from columns Vb, VIII, or IIIa of said classification, and M contains at least one element from columns VIb, VIIb, Ib, or IIb of said classification, where:

$0 \leq x \leq 10$, $0 \leq y \leq 3$ if A contains elements from column IIa only, and $0.2 \leq y \leq 3$ if A contains at least one element from columns IIIb or IVb.

The optical fiber cable is characterized in that it includes such a crystalline intermetallic compound.

18 Claims, 1 Drawing Sheet

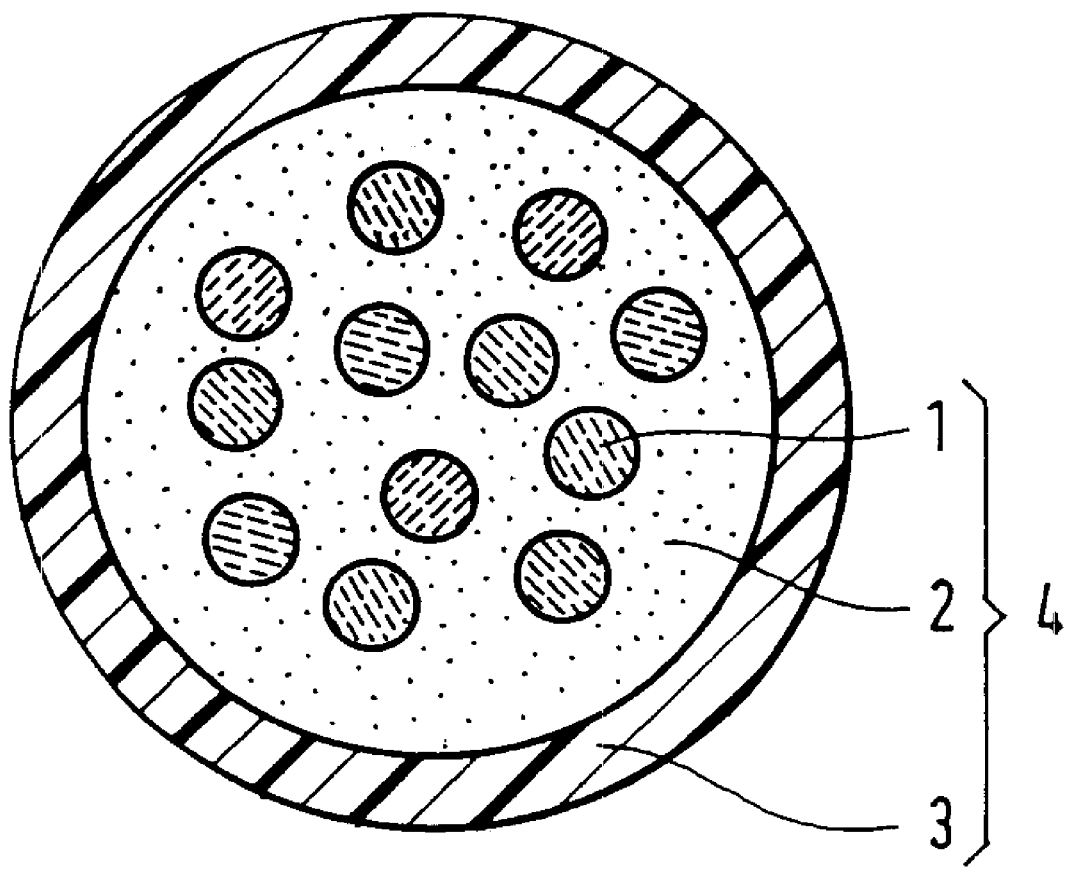

OPTICAL FIBER AND FIBRE-OPTIC CABLE COMPRISING AT LEAST ONE INTERMETALLIC ELEMENT THAT ABSORBS HYDROGEN

The present invention relates to an optical fiber including an intermetallic compound to absorb hydrogen. The present invention also relates to an optical fiber cable including such an intermetallic compound for absorbing hydrogen.

An optical fiber itself comprises a light-guiding portion made of optionally-doped silica, and it is covered as a general rule by a primary covering and optionally by a secondary covering, generally made of polymer, in order to protect it from its environment. Such a covered fiber is usually intended for inclusion in a data transmission cable. An optical fiber cable used for transmitting data is a cable comprising at least one optical fiber included in a housing, which housing may be made in part out of metal or of plastics material, said cable possibly also having reinforcing components to provide traction strength or other metal components such as armoring or coverings.

The problem of attenuation in optical signal transmission due to hydrogen being absorbed into the silica lattice of optical fibers is known. Thus, U.S. Pat. No. 4,718,747, for example, proposes a solution which consists in introducing an element or an alloy of elements or an intermetallic compound of elements from groups III, IV, V, and VIII of the periodic table in an optical fiber structure or an optical fiber cable. Said elements are preferably lanthanides for group III, titanium, zirconium, and hafnium for group IV, vanadium, niobium, and tantalum for group V, and palladium for group VIII, and in still more preferred manner, these elements are lanthanum, zirconium, hafnium, vanadium, niobium, tantalum, or palladium. Palladium is the element that is in most widespread use in practice.

Unfortunately, such a solution implies using metals which are very expensive, for example the best known of them is palladium (Pd). Furthermore, the compounds obtained from groups III, IV, and V are easily polluted by other gases (such as carbon dioxide $CO_2$, carbon monoxide CO, or oxygen $O_2$) and can thus turn out to react very poorly with hydrogen once they have been polluted. Consequently, they are difficult to use, particularly industrially, since precautions need to be taken to ensure that they are conserved under an inert atmosphere, . . . . Finally, compounds based on elements from column VIII of the periodic table generally present high plateau pressures and form unstable hydrides with hydrogen. A demand has therefore appeared for compounds that provide better performance in terms of hydrogen absorption.

The intermetallic compound for absorbing hydrogen in accordance with the invention seeks to mitigate the drawbacks of prior art solutions, and in particular to enable hydrogen to be absorbed within optical fibers by forming stable hydrides of low plateau pressure, and thus greater capacity to reduce the presence of hydrogen within optical fiber cables.

The invention thus provides an optical fiber comprising a light-guiding portion and a peripheral portion around its light-guiding portion, the peripheral portion being constituted by at least one protective covering, the optical fiber including, in a covering outside its light-guiding portion, at least one crystalline intermetallic compound made up of at least two metals, the compound having a plateau pressure during hydride formation that is less than equal to $5 \times 10^{-2}$ atmospheres (atm) (where 1 atm=$1.013 \times 10^5$ pascals (Pa)) measured by a PCT (pressure composition temperature) method and of the form $AB_xM_y$, where:

A is constituted by at least one element from columns IIa, IIIb, or IVb of the periodic classification of the elements (CAS version);

B is constituted by at least one element from columns Vb, VIII, or IIIa of the periodic classification of the elements (CAS version);

M contains at least one element from columns VIb, VIIb, Ib, or IIb of the periodic classification of the elements (CAS version);

with:

$0 \leq x \leq 10$;

$0 \leq y \leq 3$ if A contains elements from column IIa only; and $0.2 \leq y \leq 3$ if A contains at least one element from columns IIIb or IVb.

Said crystalline intermetallic compound present in a covering outside the light-guiding portion of the fiber can be incorporated in the optical fiber in various ways, for example by being incorporated in at least one covering of said fiber.

The invention also provides an optical fiber cable having at least one optical fiber, the cable including at least one crystalline intermetallic compound formed by at least two metals, having a plateau pressure during hydride formation that is less than or equal to $5 \times 10^{-2}$ atm measured at 30° C. by a PCT method, the compound being of the form $AB_xM_y$, where:

A is constituted by at least one element from columns IIa, IIIb, or IVb of the periodic classification of the elements (CAS version);

B is constituted by at least one element from columns Vb, VIII, or IIIa of the periodic classification of the elements (CAS version);

M contains at least one element from columns VIb, VIIb, Ib, or IIb of the periodic classification of the elements (CAS version);

with:

$0 \leq x \leq 10$;

$0 \leq y \leq 3$ if A contains elements from column IIa only; and $0.2 \leq y \leq 3$ if A contains at least one element from columns IIIb or IVb.

In an embodiment of the invention, said crystalline intermetallic compound, whether present in an optical fiber or in an optical fiber cable is coated at least in part by a deposit of metal having the effect of protecting said intermetallic compound from pollution by a gas different from hydrogen such as oxygen $O_2$, carbon monoxide CO, or carbon dioxide $CO_2$, for example, and where said deposit nevertheless enables hydrogen to diffuse to the intermetallic compound. Such a metal deposit can be a deposit of nickel (Ni) or of copper (Cu).

Said crystalline intermetallic compound can be incorporated in the optical fiber cable in various ways, for example in a matrix, such as a DSM 3471-2-102 covering, in a polymer compound such as a Vestodur 3000 polybutylene terephthalate for the housing tube when said tube is made of polymer material, in a filler gel such as a Huber LA444 cable gel, or in any other manner available to the person skilled in the art.

Advantageously, such a crystalline intermetallic compound presents a plateau pressure which fixes the partial pressure of residual hydrogen in the cable at a very low level, less than or equal to $5 \times 10^{-2}$ atm so that attenuation is very low. One of the advantages of the crystalline intermetallic compound used in accordance with the invention in an optical fiber or in an optical fiber cable is that the equilibrium pressure plateau is preferably as flat as possible so as to maintain a performance level that is as constant as possible. Finally, another advantage of said crystalline intermetallic compound is that its absorption capacity is preferably as high as possible so as to maximize the lifetime of the optical fiber cable. This characteristic is generally expressed in terms of H/M, H/ABxMy, or as a percentage by weight.

Various examples of crystalline intermetallic compounds suitable for use in the invention in an optical fiber or an in optical fiber cable are given below.

A first example of a crystalline intermetallic compound usable in the invention is an alloy of the $AB_5$ type, optionally at least partially, i.e. partially or totally, substituted by M. In the family of $AB_5$ type alloys, the best known is $LaNi_5$ which has a plateau pressure of 1.7 atm at 250° C., which makes this compound unsuitable for the present invention. Substituting the Ni with Cr (column VIb) makes it possible to lower the plateau pressure to 0.04 atm for the compound $LaNi_4Cr$ when characterized at the same temperature; the resulting intermetallic compound thus comes within the invention. Substituting the Ni with Mn (column VIIb) makes it possible to lower the plateau pressure to 0.02 atm for the compound $LaNi_4Mn$ at 20° C.; the resulting crystalline intermetallic compound thus comes within the invention.

A second example of a crystalline intermetallic compound suitable for use in the invention is an alloy of the $AB_2$ type, optionally at least partially substituted by M. In the family of $AB_2$ alloys, $ZrFe_{1.4}Cr_{0.6}$ has a plateau pressure of 3 atm at 20° C., which means that this compound does not come within the invention. In contrast, total substitution of the Fe with Cr (column VIb) lowers the plateau pressure to 0.003 atm at 25° C. for $ZcCr_2$; the resulting crystalline intermetallic compound thus comes within the invention.

A third example of a crystalline intermetallic compound suitable for use in the invention is an alloy of the AB type, optionally at least partially substituted by M. In the family of AB type alloys, TiFe has a plateau pressure of 5.2 atm at 30° C., which excludes this compound from the invention. In contrast, substituting the Fe with Cu (column Ib) makes it possible to obtain a plateau pressure of 0.00002 atm at 25° C. for TiCu; the resulting crystalline intermetallic compound thus comes within the invention.

A fourth example of a crystalline intermetallic compound suitable for use in the invention is an alloy of the $A_2B$ type, optionally at least partially substituted by M. In the $A_2B$ family, compounds such as $Zr_2Cu$ or $Ti_2Cu$ have plateau pressures well below 0.1 atm at high temperatures (400° C. to 600° C.). It happens that plateau pressure decreases with temperature, which provides good possibilities for these compounds being usable in then context of the invention.

All of the crystalline intermetallic compounds belonging to the above-described families come within the invention. Nevertheless this list of compounds is not limiting. Other crystalline intermetallic compounds not belonging to the above-described families can also be proposed, such as $Mg_{51}Zn_{20}$ ($MgZn_{0.39}$) which has a plateau pressure of $3 \times 10^{-7}$ atm at 25° C. Similarly compounds of the $AB_xM_y$ type can be envisaged in the present invention.

To summarize, the crystalline intermetallic compounds in the table below come within the invention:

TABLE

| Formula of compound | A | B | M | x | y | Pressure* (atm) |
|---|---|---|---|---|---|---|
| $LaNi_4Cr$ | La (IIIb) | Ni (VIII) | Cr (VIb) | 4 | 1 | 0.04 |

TABLE-continued

| Formula of compound | A | B | M | x | y | Pressure* (atm) |
|---|---|---|---|---|---|---|
| $LaNi_4Mn$ | La (IIIb) | Ni (VIII) | Mn (VIIb) | 4 | 1 | 0.02 |
| $ZrCr_2$ | Zr (IVb) | | Cr (VIb) | 0 | 2 | 0.003 |
| TiCu | Ti (IVb) | | Cu (Ib) | 0 | 1 | 0.00002 |
| $Zr_2Cu$ | Zr (IVb) | | Cu (Ib) | 0 | 0.5 | 0.003** |
| $Ti_2Cu$ | Ti (IVb) | | Cu (Ib) | 0 | 0.5 | 0.02*** |
| $Mg_{51}Zn_{20}$ | Mg (IIa) | | Zn (IIb) | 0 | 0.39 | $3 \times 10^{-7}$ |

*All pressures are given for a temperature in the range 20° C. to 30° C., except:
**at 600° C.
***at 500° C.

The invention will be better understood and other characteristics and advantages thereof will appear on reading the following description given by way of non-limiting example and with reference to FIG. 1.

FIG. 1 is a simplified diagrammatic cross-section view of a unitube optical fiber cable. The cable 4 comprises an outer sheath constituted by a thermoplastic tube 3, and it contains optical fibers 1. The tube 3 is filled with a filler gel 2 which fills the space around the optical fibers 1 inside said tube 3.

EXAMPLES

The following examples illustrate the invention, but without limiting its scope.

Example 1

The crystalline intermetallic compound used in the invention is incorporated in the filler gel (reference 2 in FIG. 1) placed inside the tube. The gel can be a commercial gel of the Huber La444 type. Its composition is such that 5% of intermetallic compound powder, after prior grinding to a mean diameter of 30 micrometers ($\mu$m) is incorporated into the gel by means of a Werner arm mixer. The gel containing the intermetallic compound powder is then put into place in the cable.

Example 2

The crystalline intermetallic compound is incorporated into the thermoplastic tube (reference 3 in FIG. 1). By way of example, the thermoplastic can be Vestodur 3000 polybutylene terephthalate in the form of granules and the intermetallic compound can be in the form of a powder having a grain size of 30 $\mu$m. The thermoplastic and the intermetallic compound powder are mixed in a Brabender type mixer, possibly together with lubricant to attenuate the abrasive effect of the intermetallic compound, and also with wetting agents. The composition is such that 5% intermetallic compound is included in the thermoplastic prior to extruding the combined thermoplastic and intermetallic compound.

Example 3

The crystalline intermetallic compound is incorporated in a polymer binder. By way of example the polymer binder can be a DSM 3471-2-102 covering. The mixture of polymer binder and intermetallic compound is deposited around the optical fiber (reference 1 in FIG. 1) as a secondary covering for the fiber, using a coating method. The thickness of the covering is 30 µm and the mean diameter of the intermetallic compound is 5 µm. The composition is such that 3% of the intermetallic compound is included in the polymer binder prior to deposition.

What is claimed is:

1. An optical fiber comprising a light-guiding portion and a peripheral portion around its light-guiding portion, the peripheral portion being constituted by at least one protective covering, the optical fiber including, in a covering outside its light-guiding portion, at least one crystalline intermetallic compound made up of at least two metals, the compound having a plateau pressure during hydride formation that is less than equal to $5 \times 10^{-2}$ atm (where 1 atm= $1.013 \times 10^5$ Pa) measured by a PCT (pressure composition temperature) method and of the form $AB_xM_y$ where:

A is constituted by at least one element from columns IIa, IIIb, or IVb of the periodic classification of the elements (CAS version);

B is constituted by at least one element from columns Vb, VIII, or IIIa of the periodic classification of the elements (CAS version);

M contains at least one element from columns VIb, VIIb, Ib, or IIb of the periodic classification of the elements (CAS version);

with:

$0 \leq x \leq 10$;

$0 \leq y \leq 3$ if A contains elements from column IIa only; and $0.2 \leq y \leq 3$ if A contains at least one element from columns IIIb or IVb.

2. A fiber according to claim 1, such that said crystalline intermetallic compound is an alloy of the $AB_5$ type, optionally substituted at least in part by M.

3. A fiber according to claim 1, such that said crystalline intermetallic compound is an alloy of the $AB_2$ type, optionally substituted at least in part by M.

4. A fiber according to claim 1, such that said crystalline intermetallic compound is an alloy of the $A_2B$ type, optionally substituted at least in part by M.

5. A fiber according to claim 1, such that said crystalline intermetallic compound is an alloy of the AB type, optionally substituted at least in part by M.

6. A fiber according to claim 1, such that said crystalline intermetallic compound present in a covering outside the light-guiding portion of the fiber is incorporated in the optical fiber in at least one covering of said fiber.

7. A fiber according to claim 1, such that said crystalline intermetallic compound is coated at least in part by a metal deposit having effect of protecting said crystalline intermetallic compound from being polluted by a gas different from hydrogen, such as oxygen $O_2$, carbon monoxide CO, or carbon dioxide $CO_2$, for example, said deposit nevertheless enabling hydrogen to diffuse to said intermetallic compound.

8. A fiber according to claim 7, such that said crystalline intermetallic compound is coated by a deposit of nickel (Ni) or of copper (Cu).

9. An optical fiber cable having at least one optical fiber, the cable including at least one crystalline intermetallic compound formed by at least two metals, having a plateau pressure during hydride formation that is less than or equal to $5 \times 10^{-2}$ atm measured at 30° C. by a PCT method, the compound being of the form $AB_xM_y$, where:

A is constituted by at least one element from columns IIa, IIIb, or IVb of the periodic classification of the elements (CAS version);

B is constituted by at least one element from columns Vb, VIII, or IIIa of the periodic classification of the elements (CAS version);

M contains at least one element from columns VIb, VIIb, Ib, or IIb of the periodic classification of the elements (CAS version);

with:

$0 \leq x \leq 10$;

$0 \leq y \leq 3$ if A contains elements from column IIa only; and $0.2 \leq y \leq 3$ if A contains at least one element from columns IIIb or IVb.

10. A cable according to claim 9, such that crystalline intermetallic compound is an alloy of the $AB_5$ type, optionally at least partially substituted by M.

11. A cable according to claim 9, such that crystalline intermetallic compound is an alloy of the $AB_2$ type, optionally at least partially substituted by M.

12. A cable according to claim 9, such that crystalline intermetallic compound is an alloy of the $A_2B$ type, optionally at least partially substituted by M.

13. A cable according to claim 9, such that crystalline intermetallic compound is an alloy of the AB type, optionally at least partially substituted by M.

14. A cable according to claim 9, such that said crystalline intermetallic compound is coated at least in part by a metal deposit having effect of protecting said intermetallic compound from being polluted by a gas different from hydrogen, such as oxygen $O_2$, carbon monoxide CO, or carbon dioxide $CO_2$, for example, said deposit nevertheless enabling hydrogen to diffuse to said intermetallic compound.

15. A cable according to claim 14, such that said crystalline intermetallic compound is coated by a deposit of nickel (Ni) or of copper (Cu).

16. A cable according to claim 9, such that said crystalline intermetallic compound is incorporated in the optical fiber cable by being incorporated in a matrix.

17. A cable according to claim 9, such that said crystalline intermetallic compound is incorporated in the optical fiber cable in the polymer compound of the housing tube when said tube is made of polymer material.

18. A cable according to claim 9, such that said crystalline intermetallic compound is incorporated in the optical fiber cable in a filler gel of the cable.

* * * * *